M. BECK.
TAP HOLDER AND TAP.
APPLICATION FILED APR. 1, 1911.
1,043,192.
Patented Nov. 5, 1912.
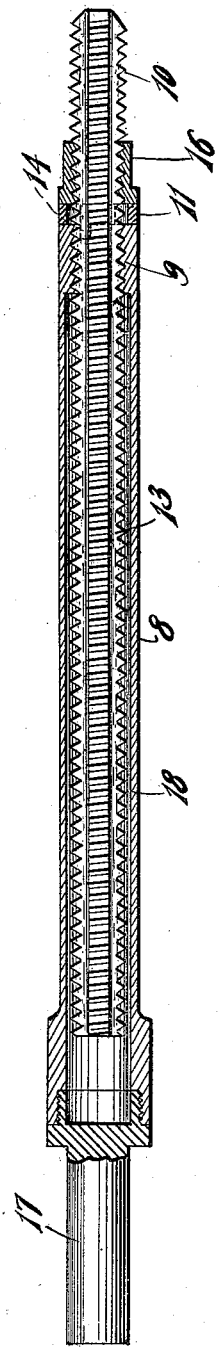
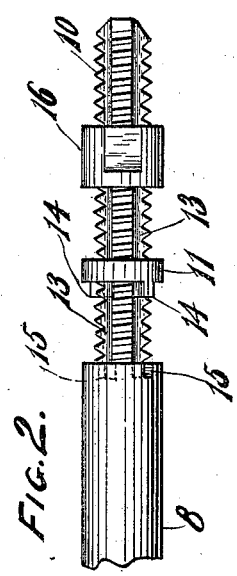
WITNESSES.
INVENTOR.
Michael Beck
By Morsell & Caldwell
ATTORNEYS.

UNITED STATES PATENT OFFICE.

MICHAEL BECK, OF RACINE, WISCONSIN, ASSIGNOR OF ONE-HALF TO EDWARD F. FREEMAN, OF RACINE, WISCONSIN.

TAP-HOLDER AND TAP.

1,043,192.　　　　Specification of Letters Patent.　　Patented Nov. 5, 1912.

Application filed April 1, 1911. Serial No. 618,373.

*To all whom it may concern:*

Be it known that I, MICHAEL BECK, a citizen of the United States, residing in Racine, in the county of Racine and State of Wisconsin, have invented new and useful Improvements in Tap-Holders and Taps, of which the following is a description, reference being had to the accompanying drawings, which are a part of this specification.

This invention relates to improvements in a tap holder and taps and more particularly to a tap holder adapted to hold taps of various lengths and in which the tap is extensible in the holder.

In machine shop practice it is customary to work with comparatively short taps in order to have the work close to the holder and consequently the thread of the tap is not of considerable length, and when the end of the tap becomes broken there is not sufficient cutting thread left to admit of regrinding the end and still have enough threads left to use in tapping, and the broken taps are therefore thrown away. As the taps are formed of expensive tool steel, this results in great waste.

It is one of the objects of this invention to provide a tap holder and tap in which the taps are held extensibly therein and in which the taps are of considerable length whereby the tap may be used at a point comparatively close to the holder and in case the end of the tap is broken, the cutting portion may be further withdrawn from the holder and the end reground and the tap becomes as serviceable as when it was first made.

A further object of the invention is to provide a tap holder and tap in which the taps may be extended any desired distance from the end of the holder to suit different classes of work.

A further object of the invention is to provide a tap holder and tap in which the taps are extensible therein and in which the holder is of a diameter but slightly larger than the diameter of the tap itself.

A further object of the invention is to provide a tap holder and tap of the character described which are of simple construction and operation and which consist of a minimum number of parts and are inexpensive to manufacture.

With the above and other objects in view, the invention consists of the tap holder and tap and its parts and combinations as set forth in the claims, and all equivalents thereof.

In the accompanying drawing in which the same reference characters indicate the same parts in all of the views: Figure 1 is a longitudinal sectional view of the tap holder and its tap connected thereto; Fig. 2 is a side view of a portion of the holder and tap, the means for locking the tap in the holder being shown separated from the cylindrical casing; Fig. 3 is a face view of the lock washer for locking the tap against rotation within the holder; Fig. 4 is a side view thereof; and Fig. 5 is a face view of the lock nut for locking the parts in adjusted position.

Referring to the drawing the numeral 8 indicates a cylindrical casing which is provided with an inner threaded portion 9 at its forward end and in which the tap 10 is threaded. The tap member 10 is comparatively long and is threaded and longitudinally grooved from end to end and the cylindrical casing is adapted to receive the major portion of the tap with only the portion protruding from the end thereof which it is desired to use. A lock washer 11 provided with inwardly extending radial ribs 12 to fit the longitudinally extending grooves 13 of the tap is also provided on one of its faces with transverse key ribs 14 which engage corresponding notches or recesses 15 formed in the threaded end of the cylindrical casing to prevent the tap member from turning within the tap holder when in locked position. A lock nut 16 threaded on the projecting end of the tap member bears against the lock washer to hold and lock it in position.

The shank 17 of the tap holder may be of any desired shape, but is preferably separable therefrom and threaded to the end thereof for convenience in drilling out the enlarged tubular portion 18 of the cylindrical casing.

In use the tap member is threaded in the threaded end of the cylindrical casing with but a short portion projecting out of the end thereof. The lock washer is then slid over the end of the tap with the inwardly extending ribs engaging the longitudinal grooves of the tap until the key ribs enter the recesses of the cylindrical casing. The lock nut is then threaded on the projecting end of the tap until it bears against the lock washer and holds and securely locks it in position.

If the end of the tap should become broken the lock nut is loosened to permit the lock washer to be moved out of engagement with the notched end of the cylindrical casing and the tap to be threaded out of the casing to the desired extent. The washer is then slid back into locking position and the lock nut turned into locking engagement with the washer as before. The end of the tap is repaired by regrinding and when reground is as good as when first used.

From the foregoing description it will be seen that the tap holder and tap are very simple in construction and operation and is inexpensive to manufacture. The small diameter of the cylindrical casing permits the tool to be used in cutting threads quite close to angled portions or to extend through comparatively small openings and also that very short taps may be used that would ordinarily be thrown away as useless.

What I claim as my invention is:

1. A tap holder and tap, comprising a tap, a holder provided with an internal threaded portion constructed to engage the threads of the tap, a washer adapted and constructed to engage the tap and the holder to prevent the tap turning in the holder, and a member threaded on the tap for locking the washer in position.

2. A tap holder and tap, comprising a longitudinally grooved tap, a holder provided with an internal threaded portion constructed to engage the threads of the longitudinally grooved tap, a washer engaging the holder and the longitudinal grooves of the tap to prevent the tap turning in the holder, and a lock nut threaded on the tap and engaging the washer for locking the parts together.

3. A tap holder and tap, comprising a longitudinally grooved tap, comprising a notched holder provided with an internal threaded portion constructed to engage the threads of the longitudinally grooved tap, a washer provided with inwardly extending ribs which engage the longitudinal grooves of the tap and also with transverse key ribs which enter the notches of the holder, and a lock nut threaded on the tap and bearing against the washer for locking the parts together.

4. A tap holder and tap, comprising a cylindrical casing provided with an internal threaded portion near one end and a notch at one end, a longitudinal grooved tap threaded in the threaded portion of the casing, a washer provided with an inwardly extending rib which enters one of the longitudinal grooves of the tap and also provided with a transverse key rib which enters the notch of the casing, and a lock nut threaded on the tap and bearing against the washer for locking the parts together.

5. A tap holder and tap, comprising a cylindrical casing provided with an internal threaded portion near one end, a longitudinally grooved tap threaded in the threaded portion of the tap and having a part projecting therefrom, a washer surrounding the tap and having a portion which enters one of the grooves of the tap, means provided for locking the washer to the casing, and lock nut threaded on the tap for locking the parts together.

6. A tap holder and tap, comprising a cylindrical casing provided with an internal threaded portion near one end, and having notches formed in the same end, a longitudinally grooved tap threaded in the threaded portion of the tap and having a part projecting therefrom, a washer surrounding the tap and having inwardly extending ribs which fit the longitudinal grooves of the tap and also having transverse key ribs which enter the notches of the casing, and a lock nut threaded on the tap and bearing against the washer to lock the parts together.

In testimony whereof, I affix my signature, in presence of two witnesses.

MICHAEL BECK.

Witnesses:
R. S. C. CALDWELL,
KATHERINE HOLT.

Copies of this patent may be obtained for five cents each, by addressing the "Commissioner of Patents, Washington, D. C."